United States Patent
Tanaka et al.

(10) Patent No.: US 7,365,782 B2
(45) Date of Patent: Apr. 29, 2008

(54) IMAGE PICKUP DEVICE AND METHOD FOR ENABLING SWITCHING BETWEEN A FIRST RECORDING MEDIUM AND A SECOND RECORDING MEDIUM

(75) Inventors: Hiroki Tanaka, Tokyo (JP); Masako Muro, Kanagawa (JP); Ryo Nagahashi, Tokyo (JP)

(73) Assignee: Sony Corporation (JP)

( * ) Notice: Subject to any disclaimer, the term of this patent is extended or adjusted under 35 U.S.C. 154(b) by 728 days.

(21) Appl. No.: 10/432,695

(22) PCT Filed: Jun. 7, 2002

(86) PCT No.: PCT/JP02/05680

§ 371 (c)(1),
(2), (4) Date: May 27, 2003

(87) PCT Pub. No.: WO03/003733

PCT Pub. Date: Jan. 9, 2003

(65) Prior Publication Data

US 2004/0013413 A1    Jan. 22, 2004

(30) Foreign Application Priority Data

Jun. 27, 2001    (JP) .............................. 2001-194915

(51) Int. Cl.
*H04N 5/76*   (2006.01)
*H04N 5/222*  (2006.01)

(52) U.S. Cl. ............................. 348/231.99; 348/23.17; 348/231.8; 348/333.01; 348/333.02; 715/717

(58) Field of Classification Search ............. 348/231.7, 348/231.8, 333.01, 333.02, 333.05, 333.11, 348/231.99–231.9; 715/717, 719
See application file for complete search history.

(56) References Cited

U.S. PATENT DOCUMENTS 5,424,772 A *  6/1995  Aoki et al. .............. 348/220.1

(Continued)

FOREIGN PATENT DOCUMENTS

JP    11-136610 A    5/1999

(Continued)

*Primary Examiner*—David Ometz
*Assistant Examiner*—Pritham D. Prabhakher
(74) *Attorney, Agent, or Firm*—Lerner, David, Littenberg, Krumholz & Mentlik, LLP

(57) ABSTRACT

When a key for directly transferring from the screen of a "video mode" of tape reproduction to the screen of memory stick reproduction is separately arranged, the ratio of an occupation area of the key on the screen is increased. Therefore, a setting operation is performed such that a stop key (11a) is displayed when the "video mode" is set and no memory stick is mounted as shown in FIG. 1A, and when the tape is being reproduced as shown in FIG. 1C. In contrast to this, the setting operation is also performed such that a switching key (11f) for transferring to the reproducing screen of the memory stick of FIG. 1D is displayed when the "video mode" is set and no tape is being reproduced and the memory stick is mounted as shown in FIG. 1B.

8 Claims, 6 Drawing Sheets

U.S. PATENT DOCUMENTS

| | | | | |
|---|---|---|---|---|
| 5,729,289 A | * | 3/1998 | Etoh | 348/333.02 |
| 6,122,003 A | * | 9/2000 | Anderson | 348/207.99 |
| 6,486,914 B1 | * | 11/2002 | Anderson | 348/333.02 |
| 6,633,336 B2 | * | 10/2003 | Toyoizumi et al. | 348/333.02 |
| 6,661,454 B1 | * | 12/2003 | Hwang et al. | 348/231.1 |
| 6,856,353 B1 | * | 2/2005 | Misawa | 348/333.07 |
| 6,927,794 B2 | * | 8/2005 | Kubo et al. | 348/231.8 |
| 6,952,229 B1 | * | 10/2005 | Takahashi et al. | 348/333.02 |
| 6,992,711 B2 | * | 1/2006 | Kubo | 348/231.7 |
| 2001/0004268 A1 | * | 6/2001 | Kubo et al. | 348/333.02 |
| 2001/0030692 A1 | * | 10/2001 | Yoneda | 348/207 |
| 2001/0030695 A1 | * | 10/2001 | Prabhu et al. | 348/232 |

FOREIGN PATENT DOCUMENTS

JP     2000-041163 A     2/2000

* cited by examiner

IMAGE PICKUP DEVICE AND METHOD FOR ENABLING SWITCHING BETWEEN A FIRST RECORDING MEDIUM AND A SECOND RECORDING MEDIUM

BACKGROUND OF THE INVENTION

1. Field of the Invention

The present invention relates to an image pickup device, its using method and its control program able to directly transfer from a video mode to a memory reproducing screen.

2. Background Art

A camera integral type VTR, etc. for recording a photographed image to plural recording media by a different recording system are recently manufactured as products of image pickup devices for recording and reproducing the photographed image. In such image pickup devices, there is a device in which a different recording mode is prepared every recording medium, and a mode change-over switch is arranged so as to select the recording mode by a user. For example, in the image pickup device for making the record to a tape and a memory card as the recording medium, a "video mode" for making the record to the tape and a "memory mode" for making the record to the memory card are prepared. These two modes are switched by the mode change-over switch.

However, when the "video mode" is selected by the user in the image pickup device for preparing the modes every recording medium in such a way, no recording and reproducing operations with respect to the memory card can be easily performed while the "video mode" is selected.

SUMMARY OF THE INVENTION

Therefore, an object of the present invention is to provide an image pickup device, its using method and its control program able to easily perform the recording and reproducing operations with respect to plural recording media so as to solve such problems.

To achieve such an object, claim 1 resides in an image pickup device characterized in that a first icon for reproducing a second recording medium is displayed in a condition in which no first recording medium is being reproduced and the second recording medium is mounted in a reproducing mode of the first recording medium.

In such an image pickup device, the second recording medium can be easily reproduced. In the conventional image pickup device, for example, when the reproducing screen in the "memory mode" is displayed, this reproducing screen must be displayed via a through screen (or picture) and electric power consumption is large on the through screen. However, the electric power consumption is reduced in the present invention since it can directly transfer from the "video mode" to the "reproducing screen of the memory stick".

In the image pickup device of claim 1, the construction of claim 2 is characterized in that the first icon is displayed by replacing one of icons displayed in the reproducing mode of the first recording medium.

In such an image pickup device, it is not necessary to separately add the first icon onto the determined screen, and no occupation area of a key on the screen is increased.

In the image pickup device of claim 2, the construction of claim 3 is characterized in that a second icon for returning to the reproducing mode of the first recording medium is displayed on a reproducing screen of the second recording medium displayed by operating the first icon.

In such an image pickup device, it is easy to return from the reproducing screen of the second recording medium to the reproducing mode of the first recording medium.

Next, claim 4 resides in a using method of an image pickup device characterized in that the reproducing screen of a second recording medium is displayed by operating a first icon for reproducing the second recording medium in a condition in which the second recording medium is mounted when no first recording medium is being reproduced in a reproducing mode of the first recording medium.

When the using method of such an image pickup device is used, it is possible to directly transfer from the reproducing mode of the first recording medium to the reproducing screen of the second recording medium.

In the using method of the image pickup device according to claim 4, the construction of claim 5 is characterized in that it is returned from the reproducing screen of the second recording medium to the reproducing mode of the first recording medium by operating a second icon of the reproducing screen of the second recording medium.

When the using method of such an image pickup device is used, it is also easy to return from the reproducing screen of the second recording medium to the reproducing mode of the first recording medium.

Next, the construction of a control program of an image pickup device according to claim 6 is characterized in that the control program comprises a step for judging whether or not no first recording medium is being reproduced and a second recording medium is mounted, a step for displaying a switching key for reproducing the second recording medium when no first recording medium is being reproduced and the second recording medium is mounted, and a step for displaying a stop key for stopping the reproduction of the first recording medium when the first recording medium is being reproduced or no second recording medium is mounted.

When the control program of such an image pickup device is used, it transfers to the step for displaying the switching key for reproducing the second recording medium only when no first recording medium is being reproduced and the second recording medium is mounted. In the other cases, it transfers to the step for displaying the stop key for stopping the reproduction of the first recording medium.

In the control program of the image pickup device according to claim 6, the construction of claim 7 is characterized in that a step for displaying a switching key for returning to a reproducing mode of the first recording medium during the reproduction of the second recording medium is arranged.

When the control program of such an image pickup device is used, it is also easy to return from the reproducing screen of the second recording medium to the reproducing mode of the first recording medium since the step for displaying the switching key for returning to the reproducing mode of the first recording medium during the reproduction of the second recording medium is arranged.

BRIEF DESCRIPTION OF THE DRAWINGS

FIG. 1A in FIG. 1 is a reproducing screen view at a non-reproducing time in a "video mode" having no memory stick. FIG. 1B is a reproducing screen view at the non-reproducing time in the "video mode" having the memory stick. FIG. 1C is a reproducing screen view during the reproduction in the "video mode". FIG. 1D is a reproducing screen view of the memory stick.

FIG. 4 relates to a case in which the camera integral type VTR is set to a "memory mode".

DESCRIPTION OF THE PREFERRED EMBODIMENTS

The best modes of an image pickup device in the present invention will next be explained.

Figure 2:
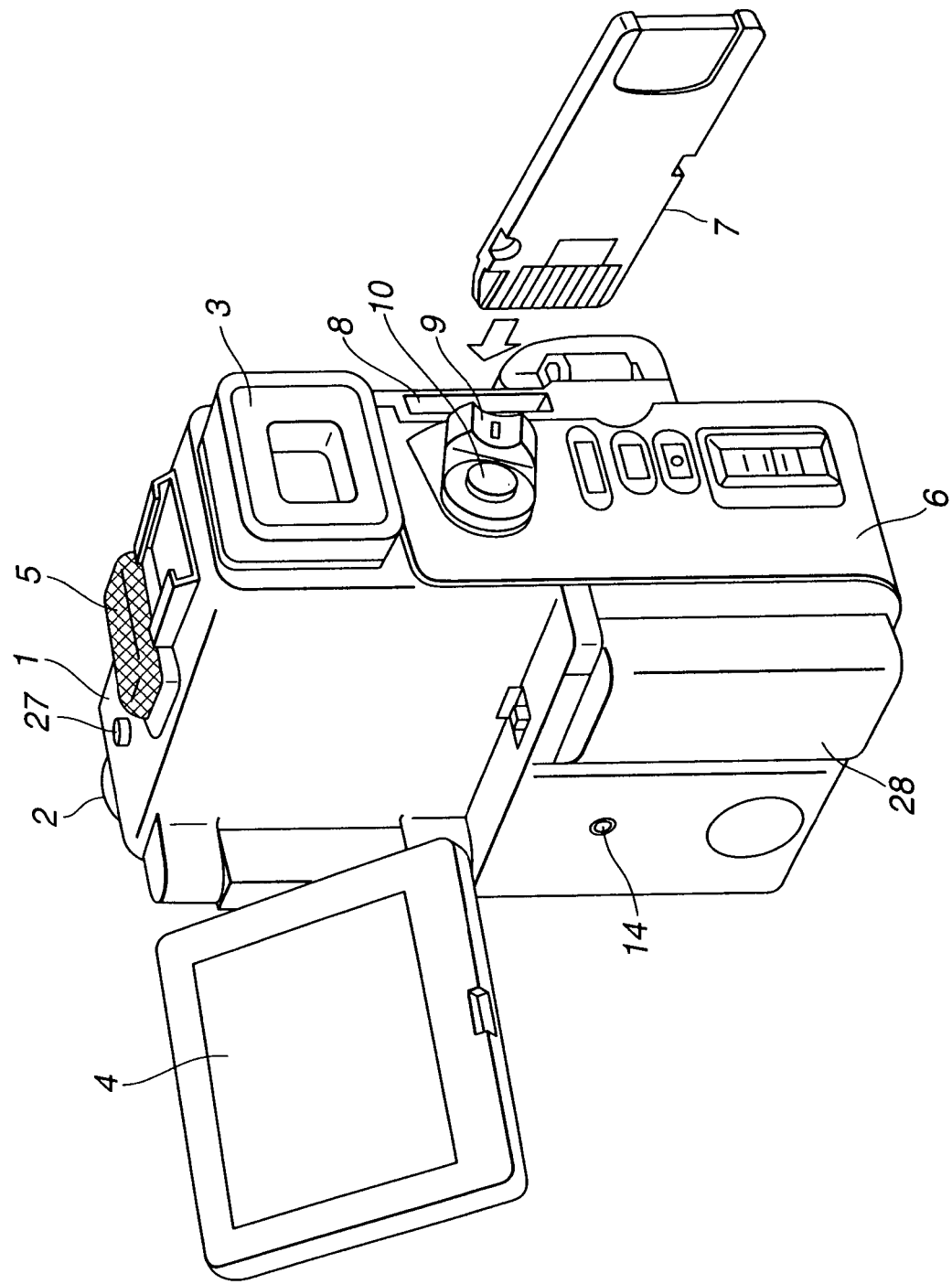
FIG. 2 is a perspective view of a camera integral type VTR as one embodiment of the image pickup device.

FIG. 2 shows the construction of a camera integral type VTR. A lens portion 2 is arranged on the side of a main body 1 opposed to a photographed body. When an image is recorded, the photographed body can be recorded while an electronic view finder 3 or a liquid crystal monitor 4 is seen. A mode change-over switch 9 is arranged so that four positions of "OFF", "camera mode", "video mode" and "memory mode" can be selected. A picture recording button 10 for recording a dynamic image to an unillustrated tape (first recording medium) or a memory stick (second recording medium) 7, and a photo button 27 for recording a static image are arranged. A microphone 5 for recording a voice is also arranged.

A cassette tape can be attached and detached by opening a cover body 6 able to be opened and closed. The memory stick 7 is detachably inserted and mounted to a medium insertion port 8. In FIG. 2, reference numerals 14 and 28 respectively designate an audio terminal and a battery of a charge type.

Figure 1:
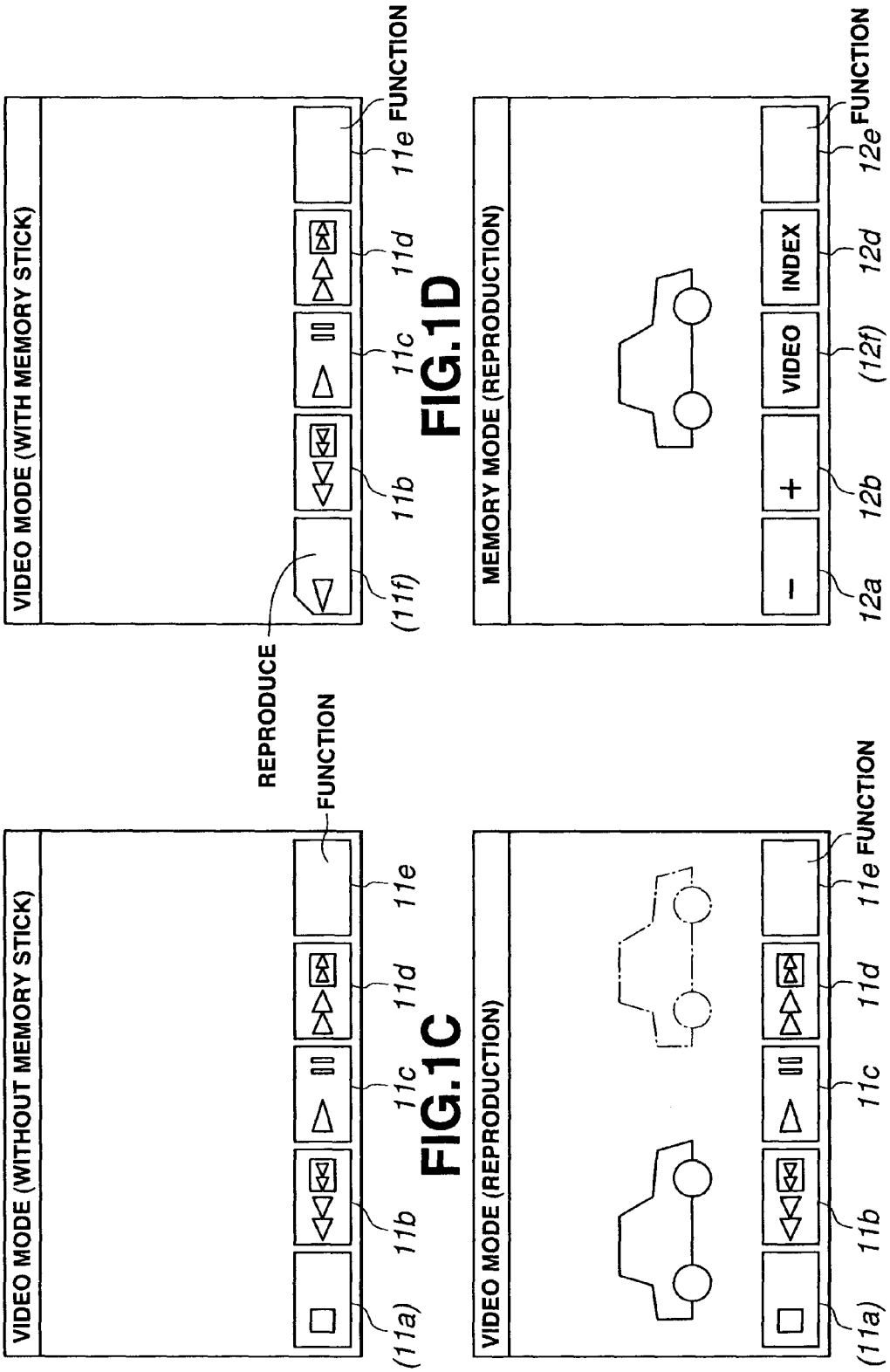
FIG. 1 relates to a best mode of an image pickup device in the present invention.

When the mode change-over switch 9 of FIG. 2 is set to the "video mode", a reproducing screen of the tape of FIG. 1A is displayed in the liquid crystal monitor 4. Similar to the conventional case, the tape can be reproduced on the reproducing screen of FIG. 1A by contact with a reproducing key 11c. In addition to this, the memory stick 7 can be reproduced in the present invention under a constant necessary condition when the "video mode" is set. Namely, as shown in FIG. 1B, a switching key (first icon) 11f able to directly transfer to a static image reproducing screen of the memory stick of FIG. 1D is displayed instead of a stop key (11a) of FIG. 1A only when no tape is being reproduced and the memory stick 7 is inserted into the medium insertion port 8. One of the tape and the memory stick can be selected and reproduced on the screen of FIG. 1B in the "video mode".

As shown in FIG. 1A, for example, the icon of the stop key (11a) is a square mark, and is displayed on the liquid crystal monitor 4 such that a user can know that this icon is a key for stopping the tape. In contrast to this, as shown in FIG. 1B, for example, the switching key 11f for reproducing the memory stick is a mark in which the character of "reproduction" and a triangular figure are drawn within a rectangular figure (similar to the outer shape of the memory stick itself) having a notched corner portion. The switching key 11f is displayed such that the user can easily distinguish this switching key 11f from the reproducing key 11c for reproducing the tape.

The above contents will next be described in detail. In the "video mode", as shown in FIGS. 1A to 1C, the original stop key existing at the left-hand end is changed in accordance with the screen. Namely, the stop key is changed as follows. As shown in FIG. 1C, since it is necessary to stop the reproduction of the tape during the reproduction of the tape, the original stop key (11a) is displayed. When the user comes in contact with this stop key (11a), the screen of a stopping state of the reproduction of the tape is attained as shown in FIG. 1A. In the case of FIG. 1A in which no memory stick 7 is mounted on the screens of FIGS. 1A and 1B for reproducing no tape, no memory stick 7 can be reproduced so that the stop key (11a) is displayed. In contrast to this, in the case of FIG. 1B in which the memory stick 7 is mounted, the switching key (11f) for switching to the reproducing screen of the memory stick of FIG. 1D is displayed.

When the user comes in contact with the switching key (11f) on the reproducing screen of the tape of FIG. 1B, it directly transfers to the reproducing screen of the memory stick 7 shown in FIG. 1D. Similar to the conventional case, a static image can be then sequentially reproduced. A switching key (second icon) (12f) for returning to the reproducing screen of the tape of the FIG. 1B is arranged on the reproducing screen of the memory stick of FIG. 1D.

Figure 5:
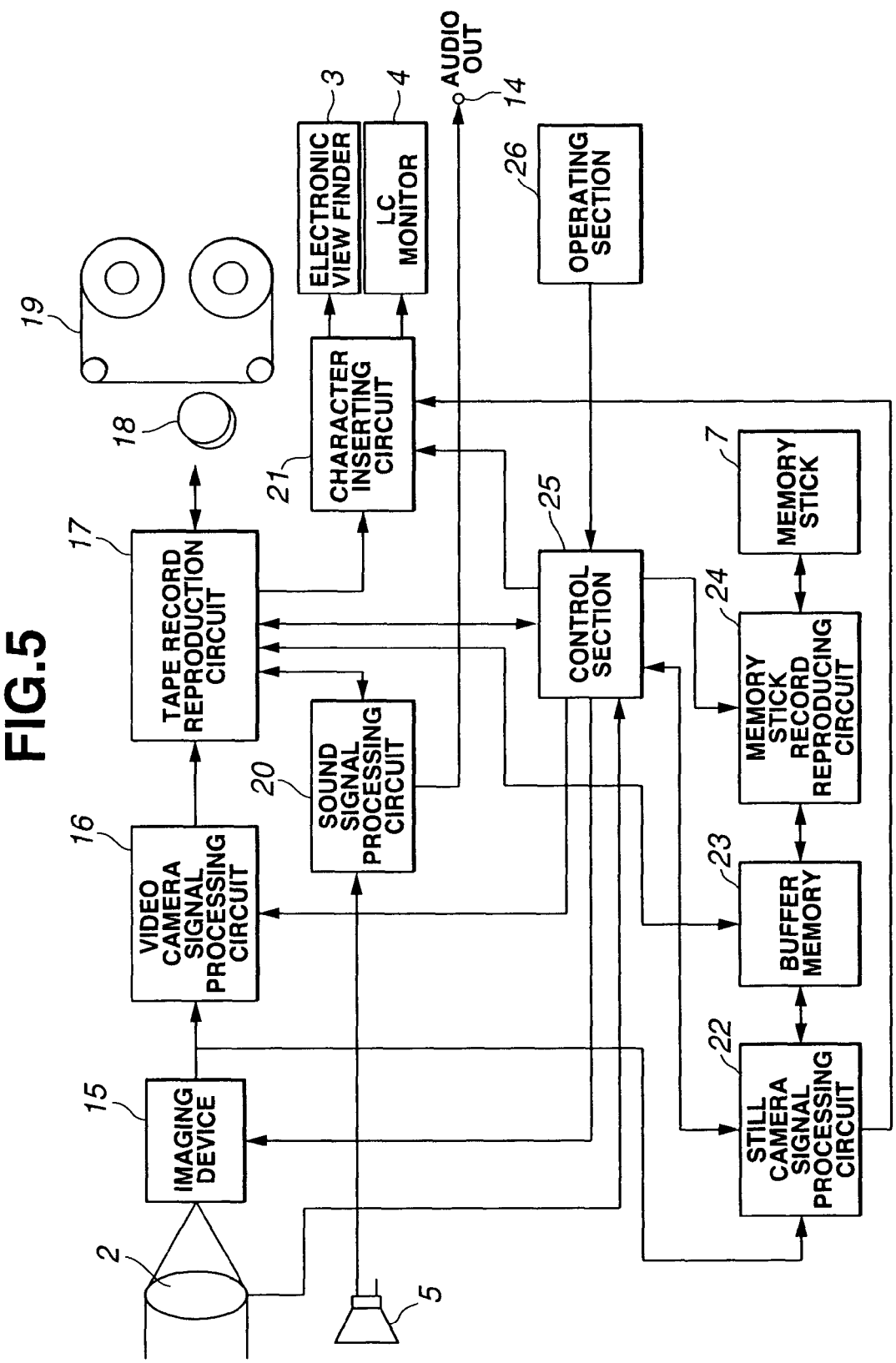
FIG. 5 is a block diagram showing a best mode of the image pickup device in the present invention.

FIG. 5 is a block diagram of a camera integral type VTR. In FIG. 5, reference numerals 15, 16 and 17 respectively designate an image pickup element for converting light to an electric signal, a video camera signal processing circuit for processing an image converted to the electric signal, and a record-reproduction processing circuit of the tape distributed to record or reproduce the image and a voice converted to the electric signal. Reference numerals 18, 19 and 20 respectively designate a magnetic head for performing the conversion between the electric signal and a magnetic signal for the record or reproduction, a tape, and an audio signal processing circuit for processing the voice converted to the electric signal. Reference numeral 21 designates a character insertion circuit for inserting a key, characters, etc. into the screen of a through image (the image of a photographed body displayed in the liquid crystal monitor 4) and a reproduced image. Reference numerals 22 and 23 respectively designate a still camera signal processing circuit for processing the image converted to the electric signal, and a buffer memory for temporarily storing the image converted to the electric signal. Reference numeral 24 designates a record-reproduction processing circuit of the memory stick for recording the image to the memory stick 7 and storing the image to the buffer memory 23 by the reproduction. Reference numerals 25 and 26 respectively designate a control section for controlling the operation of each portion, and an operation section such as a key, the picture recording button 10, the photo button 27, etc. on the liquid crystal monitor 4.

The operation of such a camera integral type VTR will next be explained.

Figure 3:
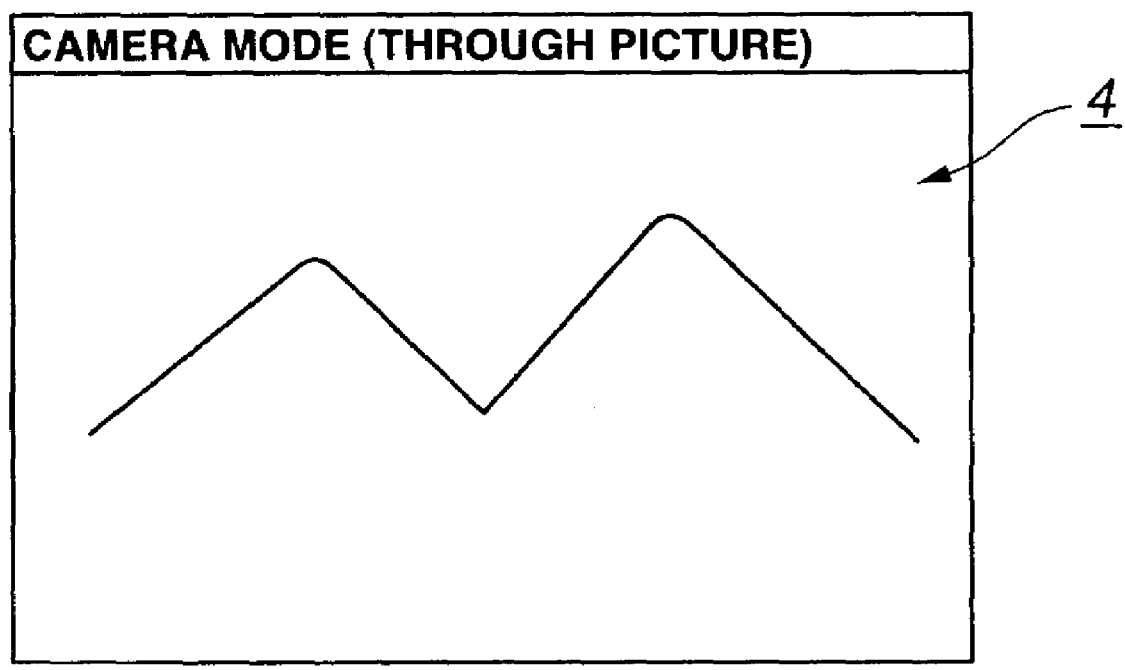
FIG. 3 is a through screen view when the camera integral type VTR is set to a camera mode.

When an image is recorded to the tape, the mode change-over switch 9 is set to the "camera mode". Thus, as shown in FIG. 3, a through image for projecting a photographed body is displayed in the electronic view finder 3 and the liquid crystal monitor 4. Accordingly, when the picture recording button 10 is pushed, a dynamic image begins to be recorded to the tape. When the picture recording button 10 is again pushed, the recording of the dynamic image is terminated. When a static image is recorded to the tape, the static image is recorded for about seven seconds if the photo button 27 is pushed. This will be explained with reference to FIG. 5. Light passing through the lens portion 2 is converted to an electric signal by the image pickup element 15. Thereafter, this electric signal is transmitted to the magnetic head 18 through the video camera signal processing circuit 16 and the record-reproduction processing circuit 17 of the tape. This electric signal is then converted to a magnetic signal in the magnetic head 18, and is recorded to the tape 19. At this time, a voice is converted to an electric signal by the microphone 5, and is recorded to the tape 19 together with the image through the audio signal processing circuit 20, the record-reproduction processing circuit 17 of the tape, and the magnetic head 18. When the picture recording button 10 is again pushed during the recording, the recording of the dynamic image is terminated. In the case of the static image, the static image is recorded only first once.

When the dynamic image or the static image recorded to the tape is next reproduced, the mode change-over switch 9 is set to the "video mode". At this time, if no memory stick 7 is mounted to the medium insertion port 8, the reproducing screen constructed by only keys is displayed in the liquid crystal monitor 4 and the electronic view finder 3 as shown in FIG. 1A. Accordingly, the image is reproduced by operating the tape by contact with each of the keys. Reference numerals 11$a$, 11$b$, 11$c$ respectively designate a stop key, an unwinding key and a reproducing key. Reference numerals 11$d$ and 11$e$ respectively designate a rapid traverse key and a function key for displaying keys for selecting a menu and the brightness of a monitor screen.

On the other hand, when the memory stick 7 is mounted to the medium insertion port 8, the reproducing screen of FIG. 1B is displayed in the liquid crystal monitor 4. The key at the left-hand end is set to the stop key (11$a$) in the display of the screen of FIG. 1A. The dynamic image or the static image can be reproduced by contact with the reproducing key 11$c$ as shown in FIG. 1C. However, the key at the left-hand end is set to the switching key (11$f$) for reproduction of the memory stick 7 on the screen of FIG. 1B. Accordingly, one of the reproduction of the tape of FIG. 1C and the reproduction of the memory stick 7 of FIG. 1D can be selected by contact with the reproducing key 11$c$ or the switching key (11$f$). Namely, the tape is reproduced by contact with the reproducing key 11$c$ as shown in FIG. 1C. The memory stick 7 is reproduced by contact with the switching key (11$f$) as shown in FIG. 1D. When it is returned from the reproducing screen of the memory stick 7 of FIG. 1D to the reproducing screen of the tape of FIG. 1B, the user comes in contact with the switching key (12$f$) of FIG. 1D. Namely, the mutual switching operation can be performed by the switching key (11$f$) and the switching key (12$f$) between the reproducing screen of FIG. 1D for reproducing the memory stick 7 and the reproducing screen of FIG. 1B for reproducing the tape.

The reproduction of the tape in the "video mode" of FIG. 1C will be explained on the basis of FIG. 5. The magnetic signals of an image and a voice recorded to the tape 19 are converted to electric signals by the magnetic head 18, and are transmitted to the record-reproduction processing circuit 17 of the tape. The image is transmitted to the electronic view finder 3 and the liquid crystal monitor 4 through the character insertion circuit 21, and characters, etc. and the image from the character insertion circuit 21 are displayed. In contrast to this, the voice is supplied to an unillustrated headphone, etc. through the audio signal processing circuit 20 and the audio terminal 14.

Figure 4A:
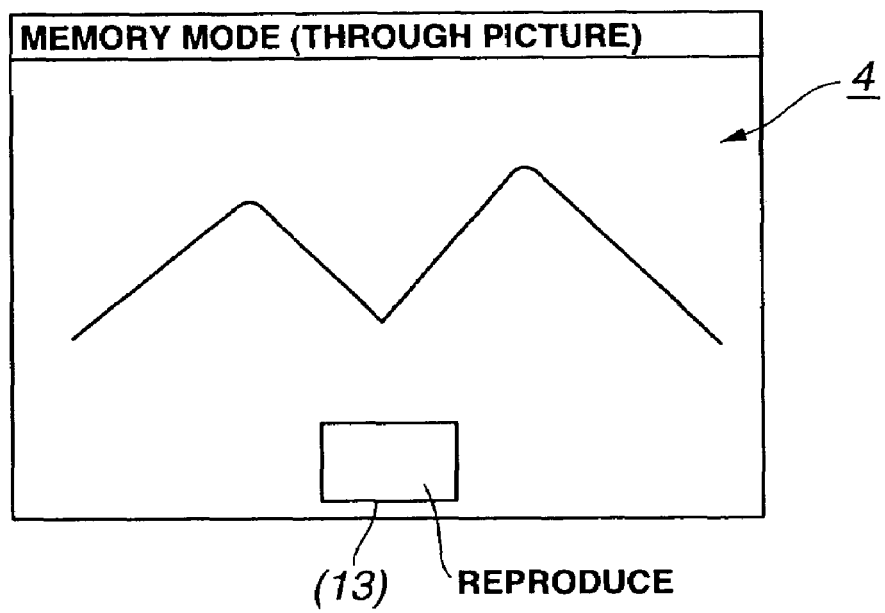
FIG. 4A in FIG. 4 is a through screen view.

When the image is next recorded to the memory stick 7, the mode change-over switch 9 is set to the "memory mode". Thus, since the "memory mode" is set and the through screen of FIG. 4A is displayed, a dynamic image begins to be recorded to the memory stick 7 when the picture recording button 10 is pushed. When the picture recording button 10 is again pushed, the recording of the dynamic image is terminated. When a static image is recorded to the memory stick 7, the photo button 27 is pushed so that the static image is recorded. The recording to the memory stick 7 will be explained on the basis of FIG. 5. The image converted to the electric signal by the image pickup element 15 is temporarily stored to the buffer memory 23 through the still camera signal processing circuit 22, and is recorded to the memory stick 7 through the record-reproduction processing circuit 24 of the memory stick.

Figure 4B:
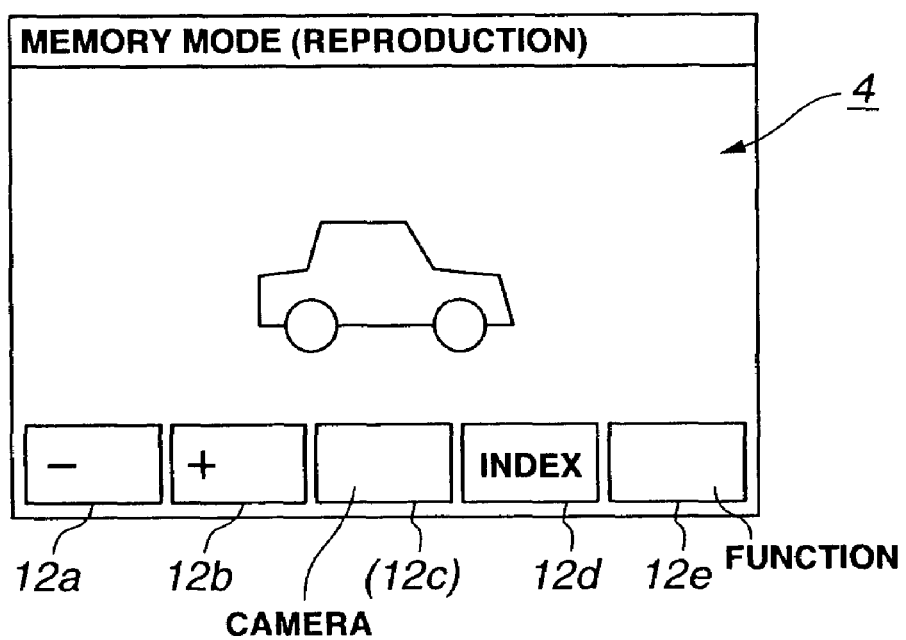
FIG. 4B is a reproducing screen view.

When the image recorded to the memory stick is reproduced, the mode change-over switch 9 is set to the "memory mode". Thus, since the through screen of FIG. 4A is first displayed in the liquid crystal monitor 4, the through screen is switched to the reproducing screen shown in FIG. 4B in contact with the key 13. Plural keys are displayed on the reproducing screen of FIG. 4B although these keys are partially conformed to the keys displayed on the reproducing screen of FIG. 1D. Reference numerals 12$a$, 12$b$ and (12$c$) respectively designate a return key for displaying the static image displayed by one before, a feed key for displaying the next static image, and a switching key for returning to the through screen of FIG. 4A. (The through screen of FIG. 4A and the reproducing screen of FIG. 4B are alternately switched by pushing the switching key (13) of FIG. 4A and the switching key (12$c$) of FIG. 4B.) Reference numerals 12$d$ and 12$e$ respectively designate an index key for displaying plural recorded static images as small thumbnail images, and a function key having the same function as the above function key 11$e$.

In addition to this, the above reproducing screen of the memory stick of FIG. 1D can be also displayed by contact with the switching key 11$f$ in a state in which the "video mode" is set and the memory stick 7 is mounted as shown in FIG. 1B as mentioned above. The static image is displayed when the reproducing screen of FIG. 4B or FIG. 1D is displayed. Accordingly, the static image can be sequentially reproduced by contact with the return key 12$a$ or the feed key 12$b$. With respect to the reproduction of the static image, the reproduced image is temporarily stored from the memory stick 7 in FIG. 5 to the buffer memory 23 through the record-reproduction processing circuit 24 of the memory stick, and is transmitted to the electronic view finder 3 and the liquid crystal monitor 4 through the still camera signal processing circuit 22 and the character insertion circuit 21. Thus, characters, etc. and the image from the character insertion circuit 21 are displayed. The explanation of the reproduction of the dynamic image using the memory stick is omitted here.

In addition to this, for example, the image recorded to the memory stick can be also recorded to the tape by displaying a key for recording the image to another recording medium such as the tape, etc. at the reproducing time of the memory stick in the "memory mode". Further, the image recorded to the tape can be also reversely recorded to the memory stick by displaying a key for recording the image to the memory stick at the reproducing time of the tape in the "video mode".

Figure 6:
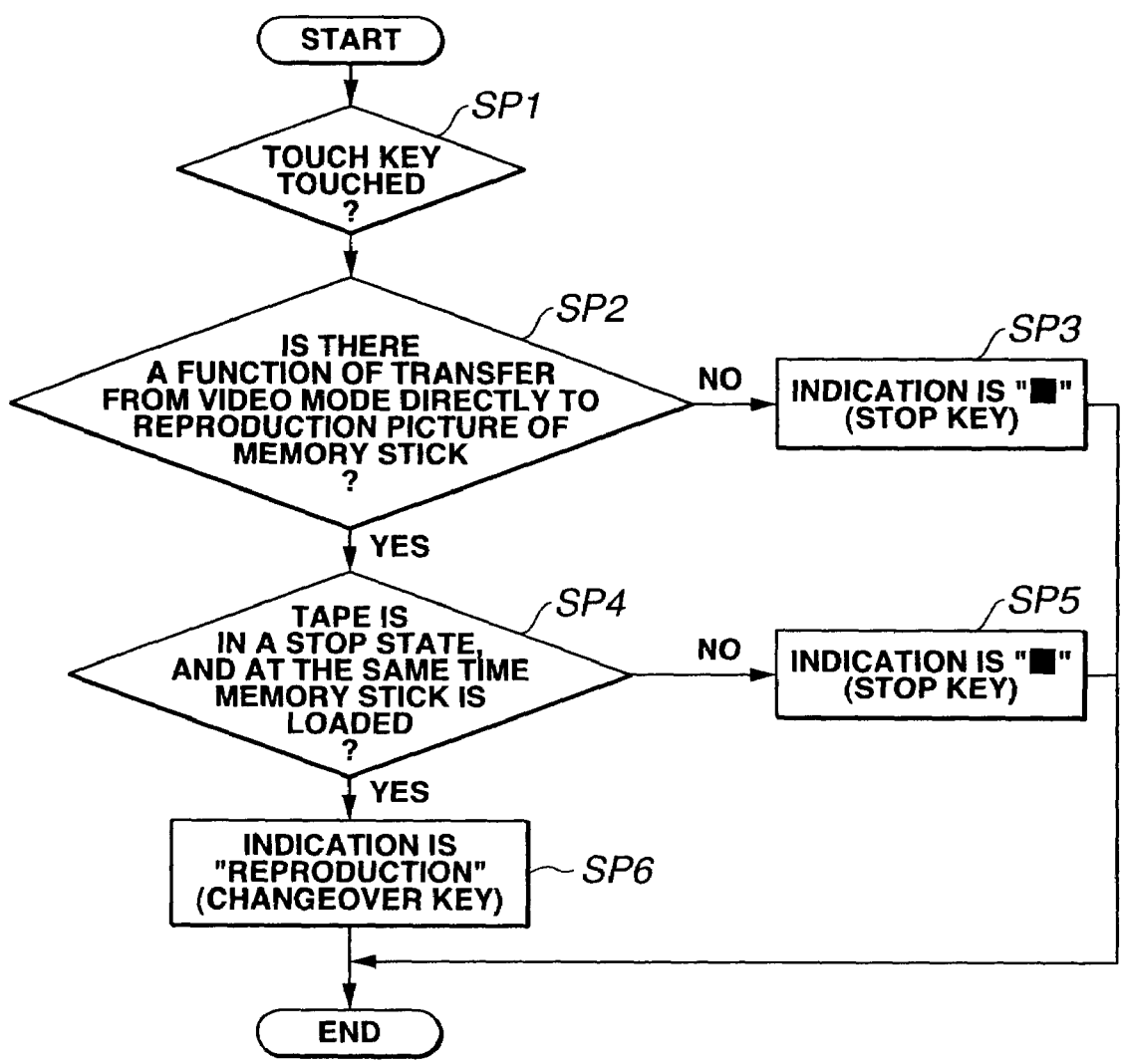
FIG. 6 is a flow chart showing a main portion of the best mode of a control program of the image pickup device in the present invention.

FIG. 6 shows a flow chart of a portion directly transferring from the "video mode" in the present invention to the "reproducing screen of the memory stick". When a user first comes in contact with the leftmost key of the liquid crystal monitor 4 displayed in FIGS. 1A, 1B and 1C in a step SP1 and there is no function for directly making the movement from the "video mode" to the "reproducing screen of the memory stick" as in the conventional case in a step SP2, there is no change since the key display in a step SP3 is set to the "stop key". In contrast to this, when there is the function for directly transferring from the "video mode" to the "reproducing screen of the memory stick", it is detected whether the tape is in a stopping state and the memory stick 7 is mounted to the medium insertion port 8 in a step SP4. When at least one of these necessary conditions is not satisfied, the key display in a step SP5 is set to the stop key (11*a*) as it is as shown in FIGS. 1A and 1C. In contrast to this, when both the necessary conditions are satisfied, the switching key (11*f*) is displayed in a step SP6 as shown in FIG. 1B. When the user comes in contact with this switching key (11*f*), the "reproducing screen of the memory stick" is displayed as shown in FIG. 1D, and the memory stick is reproduced.

INDUSTRIAL APPLICABILITY

As mentioned above, the present invention is usefully used in an image pickup device able to reproduce first and second recording media. In the best mode of the present invention, the first recording medium is the tape, and the second recording medium is the memory stick. However, CD-ROM, DVD, etc. may be used instead of the tape, and a compact flash, a multimedia card, a memory card, etc. may be also used instead of the memory stick. Otherwise, a using method reverse to this using method with respect to the tape and the memory stick may be also used.

The procedure of the processing shown in FIG. 6 can be constructed by the program of a computer, and this program can be executed by the computer. Further, this program can be also provided through a network such as the Internet, electronic mail, etc.

What is claimed is:

1. An image pickup device operable to have a first recording medium and a second recording medium mounted therein, said image pickup device comprising:
    a display unit having a display screen; and
    a control circuit operable to (i) cause a switching icon to be displayed on the display screen for enabling an operator to select a reproduction operation in which information from the second recording medium is reproduced and cause a reproducing icon to be displayed on the display screen simultaneously with the display of the switching icon for enabling the operator to select a reproduction operation in which information from the first recording medium is reproduced when the first recording medium is not involved in a reproduction operation and the second recording medium is mounted in the image pickup device, and (ii) cause the reproducing icon to be displayed on the display screen for enabling the operator to select the reproduction operation in which information from the first recording medium is reproduced and cause the switching icon to not be displayed on the display screen when the second recording medium is not mounted in the image pickup device.

2. The image pickup device according to claim 1, in which the first recording medium is a different type from that of the second recording medium.

3. The image pickup device according to claim 1, further comprising a change over switch operable to enable the operator to select a first operation mode or a second operation mode, in which the first operation mode causes a display associated with a reproduction operation involving the first recording medium to be displayed on the display screen of the display unit and the second operation mode causes a display associated with a reproduction operation involving the second recording medium to be displayed on the display screen of the display unit.

4. The image pickup device according to claim 3, in which the control circuit is operable to cause the switching icon to be displayed on the display screen for enabling the operator to select the reproduction operation in which information from the second recording medium is reproduced when the first recording medium is not involved in a current reproduction operation and the second recording medium is mounted in the image pickup device and when the operator has selected the first operation mode.

5. A method for use with an image pickup device having a display unit with a display screen and operable to have a first recording medium and a second recording medium mounted therein, said method comprising:
    determining whether the second recording medium is mounted in the image pickup device;
    causing a switching icon to be displayed on the display screen for enabling an operator to select a reproduction operation in which information from the second recording medium is reproduced and causing a reproducing icon to be displayed on the display screen simultaneously with the display of the switching icon for enabling the operator to select a reproduction operation in which information from the first recording medium is reproduced when the first recording medium is not involved in a reproduction operation and the second recording medium is determined to be mounted in the image pickup device; and
    causing the reproducing icon to be displayed on the display screen for enabling the operator to select the reproduction operation in which information from the first recording medium is reproduced and causing the switching icon to not be displayed on the display screen when the second recording medium is not mounted in the image pickup device.

6. The method according to claim 5, in which the first recording medium is a different type from that of the second recording medium.

7. The method according to claim 5, further comprising enabling the operator to select a first operation mode or a second operation mode, in which the first operation mode causes a display associated with a reproduction operation involving the first recording medium to be displayed on the display screen of the display unit and the second operation mode causes a display associated with a reproduction operation involving the second recording medium to be displayed on the display screen of the display unit.

8. The method according to claim 7, in which the causing includes causing the switching icon to be displayed on the display screen for enabling the operator to select the reproduction operation in which information from the second recording medium is reproduced when the first recording medium is not involved in a current reproduction operation and the second recording medium is mounted in the image pickup device and when the operator has selected the first operation mode.

* * * * *